(12) United States Patent
Rosenberg (10) Patent No.: US 7,732,694 B2
(45) Date of Patent: Jun. 8, 2010

(54) PORTABLE MUSIC PLAYER WITH SYNCHRONIZED TRANSMISSIVE VISUAL OVERLAYS

(75) Inventor: Louis B. Rosenberg, Arroyo Grande, CA (US)

(73) Assignee: Outland Research, LLC, Pismo Beach, CA (US)

( * ) Notice: Subject to any disclaimer, the term of this patent is extended or adjusted under 35 U.S.C. 154(b) by 757 days.

(21) Appl. No.: 11/626,992

(22) Filed: Jan. 25, 2007

(65) Prior Publication Data

US 2007/0180979 A1    Aug. 9, 2007

Related U.S. Application Data

(60) Provisional application No. 60/765,116, filed on Feb. 3, 2006.

(51) Int. Cl.
| | |
|---|---|
| G10H 1/00 | (2006.01) |
| G10H 1/40 | (2006.01) |
| G09G 3/24 | (2006.01) |
| G09G 5/00 | (2006.01) |
| G09G 5/02 | (2006.01) |
| G09B 15/00 | (2006.01) |
| G09B 15/02 | (2006.01) |
| G06T 13/00 | (2006.01) |
| G06F 17/50 | (2006.01) |
| G02B 27/14 | (2006.01) |

(52) U.S. Cl. .................. 84/464 R; 84/477 R; 84/483.1; 84/483.2; 84/611; 345/73; 345/473; 345/601; 345/629; 345/633; 359/630; 386/46; 703/13

(58) Field of Classification Search .................. 84/611, 84/464 R, 477 R, 483.2; 359/630; 386/46; 703/13
See application file for complete search history.

(56) References Cited

U.S. PATENT DOCUMENTS

| | | | | |
|---|---|---|---|---|
| 4,257,062 A | * | 3/1981 | Meredith | .................. 84/464 R |
| 4,376,404 A | * | 3/1983 | Haddad | .................... 84/464 R |
| 4,394,656 A | * | 7/1983 | Goettsche | .............. 340/825.73 |
| 4,713,658 A | * | 12/1987 | Swinton | ................ 340/815.46 |
| 4,790,629 A | * | 12/1988 | Rand | ........................... 345/601 |
| 5,191,319 A | * | 3/1993 | Kiltz | ........................... 345/73 |

(Continued)

Primary Examiner—Jeffrey Donels
Assistant Examiner—Christina Russell
(74) Attorney, Agent, or Firm—Thomas F. Lebens; Sinsheimer Juhnke Lebens & McIvor, LLP (57) ABSTRACT

A portable music player apparatus that outputs visual content to a head-worn transmissive display, the visual content being modulated in time with playing musical content and overlaid upon the user's direct view of his or her physical surroundings. In this way, the user is provided with an enhanced visual view of his or her physical surroundings, the enhanced visual view including transmissive visual content that is generally synchronized in time with the playing music content. This provides the user with an improved music listening experience in which he or she feels present within a visually enhanced version of the physical world that has changing visual qualities that are perceptually synchronized in time with one or more features of the playing music. The displayed visual content may include time-varying translucency and/or color-tinting such that the user's direct view of the physical world changes in brightness and/or color tinting in a manner choreographed with the playing music.

22 Claims, 4 Drawing Sheets

U.S. PATENT DOCUMENTS

| | | | |
|---|---|---|---|
| 5,513,129 A * | 4/1996 | Bolas et al. | 703/13 |
| 6,046,712 A * | 4/2000 | Beller et al. | 345/8 |
| 6,137,042 A * | 10/2000 | Kurtzberg et al. | 84/477 R |
| 6,474,809 B2 * | 11/2002 | Tanijiri et al. | 351/41 |
| 6,768,066 B2 | 7/2004 | Wehrenberg | 200/61.49 |
| 6,898,759 B1 * | 5/2005 | Terada et al. | 715/202 |
| 7,589,269 B2 * | 9/2009 | Lemons | 84/483.2 |
| 2002/0167536 A1 * | 11/2002 | Valdes et al. | 345/633 |
| 2004/0056870 A1 * | 3/2004 | Shimoyama et al. | 345/629 |
| 2005/0225868 A1 * | 10/2005 | Nelson et al. | 359/630 |
| 2005/0248852 A1 * | 11/2005 | Yamasaki | 359/630 |
| 2006/0181537 A1 * | 8/2006 | Vasan et al. | 345/473 |
| 2006/0238878 A1 * | 10/2006 | Miyake et al. | 359/630 |
| 2006/0288842 A1 * | 12/2006 | Sitrick et al. | 84/477 R |
| 2007/0078552 A1 * | 4/2007 | Rosenberg | 700/94 |
| 2007/0237491 A1 * | 10/2007 | Kraft | 386/46 |
| 2008/0278821 A1 * | 11/2008 | Rieger | 359/630 |
| 2009/0174946 A1 * | 7/2009 | Raviv et al. | 359/632 |

\* cited by examiner

PORTABLE MUSIC PLAYER WITH SYNCHRONIZED TRANSMISSIVE VISUAL OVERLAYS

CROSS-REFERENCE TO RELATED APPLICATIONS

This application is a non-provisional application claiming benefit and priority under 35 U.S.C. §119(e) from co-pending U.S. provisional application Ser. No. 60/765,116 filed on Feb. 3, 2006 to the instant inventor and a common assignee and is hereby incorporated by reference in their entirety as if fully set forth herein.

FEDERALLY SPONSORED RESEARCH AND DEVELOPMENT

Not Applicable

REFERENCE TO A MICROFICHE APPENDIX

Not Applicable

RELEVANT INVENTIVE FIELD

The present inventive embodiments relates generally to portable musical media playing devices and more specifically to portable musical media playing devices for concurrently outputting transmissive visual overlays to a user with the playing of a musical media file.

BACKGROUND

A number of relevant art mechanisms have been developed for automatically generating visual display content in response to audio signals. Such mechanisms are operative to modulate the control of lights, computer graphics, and/or other visually perceivable content in response to the time varying form of an audio signal.

As examples, U.S. Pat. No. 5,191,319 to Kiltz, issued Mar. 2, 1993, U.S. Pat. No. 5,513,129 to Bolas et al., issued Apr. 30, 1996, U.S. Pat. No. 6,137,042 Kurtzberg et al., issued Oct. 24, 2000, U.S. Pat. No. 4,713,658 to Swinton, issued Dec. 15, 1987, U.S. Pat. No. 4,394,656 to Goettsche, issued Jul. 19, 1983, U.S. Pat. No. 4,376,404 to Haddad, issued Mar. 15, 1983, U.S. Pat. No. 4,790,629 to Rand, issued Dec. 13, 1988, and U.S. Pat. No. 6,898,759 to Terada et al., issued May 24, 2005, all of which are herein incorporated by reference, provide a variety of techniques for analyzing the time-varying content of an audio signal and in response controlling the output of a visual display.

For example, a musical signal may be electrically processed with respect to frequency, rhythm, tempo, and/or structural content, and a display of visual content may be electronically varied in response to the detected time varying characteristics of the music. Such mechanisms may provide an enhanced music listening experience for a user who looking upon a computer screen, or looking upon a bank of lights, or otherwise engaging a computer simulation.

However, the relevant art mechanisms do not enable a user to traverse the real world while wearing a portable music player and provide the user with a visual view of the real world which is visually modified with visual content that is time synchronized to the music. An additional limitation of the relevant art does not enable a music-listening user to walk down the street, or walk down the aisle in a store, or stroll on the beach in the real world, directly viewing the landscape, while having the physical world artificially enhanced with visual content that is time synchronized to the music being listened to.

Such features are highly desirable because they enable a user to walk anywhere in the real world using, for example, a portable music player to, listen to music while simultaneously visually experiencing time-synchronized images that visually change in apparent synchronicity with the music.

Unless otherwise indicated herein, the approaches described in this section are not prior art to the claims in this application and are not admitted to be prior art by inclusion in this section.

SUMMARY

The various exemplary embodiments described herein address the limitations in the relevant art and provides an apparatus, method and computer program product that provides music-responsive transmissive visual overlays that augment a user's view of the real world. In an exemplary embodiment the apparatus comprises a processor having a memory coupled thereto, a transmissive display functionally coupled to the processor and configured to display visual content such that a user perceives the displayed visual content as a real-time visual overlay upon the user's view of the real world, a musical media file operatively loaded into the memory, a music responsive visual overlay program operatively loaded into the memory including instructions executable by the processor to modulate the visual content displayed upon the transmissive visual display in apparent time synchronicity with an audio output of the musical media file and an audio processing subsystem functionally coupled to the processor configured to provide the audio output from play of the musical media file to the user.

In an exemplary embodiment, the visual content includes an image with varying translucency time-synchronized with the playing of the musical media file thereby providing the user a view of the real world and visually varies in brightness in apparent time synchronicity with the audio output.

In another exemplary embodiment, the visual content includes an image with varying color-tinting time-synchronized with the playing of the musical media file thereby providing the user a view of the real world that visually varies in color-tinting in apparent time synchronicity with the audio output.

In yet another exemplary embodiment, the visual content includes an opaque border area that varies in at least one of size or shape with the playing of the musical media file, thereby providing the user a view of the real world that visually varies in apparent time synchronicity with the audio the modulated visual content is time-synchronized with a rhythm, melody and/or percussion sound associated with the playing musical media file.

In still another exemplary embodiment, the visual content is modulated in a time-synchronized manner with respect to the audio outputting, the modulation being performed as a result of a mathematical analysis of the musical media file. The result of the mathematical analysis may be generated in real time.

BRIEF DESCRIPTION OF THE FIGURES

The features and advantages of the various exemplary embodiments will become apparent from the following detailed description when considered in conjunction with the accompanying drawings. Where possible, the same reference numerals and characters are used to denote like features, elements, components or portions of the various inventive embodiments. It is intended that changes and modifications can be made to the described embodiment without departing from the true scope and spirit of the subject inventive embodiments as generally defined by the claims.

DETAILED DESCRIPTION

The various exemplary embodiments described herein relate to a field of research sometimes referred to as augmented reality. Augmented reality is a field in which computer generated content is presented to a user in form that is spatially registered with the user's view of the physical world. An early example of augmented reality was developed by the inventor, Rosenberg as described in "The Use of Virtual Fixtures as Perceptual Overlays to Enhance Operator Performance in Remote Environments," Air Force Material Command, September 1992. In this early work, augmented perceptual content was spatially registered with the user's view of the real world so as to assist the user in performing physical tasks. Other proposed uses of augmented reality involve presenting factual information to users to assist in detailed activities such as repairing equipment.

Another example of such relevant art is described in "Annotating Real-World Objects Using Augmented Reality" by Rose, Breen, Ahlers, Greer, Crampton, Tuceryan, and Whitaker, and published in 1995. In such augmented reality work, the computer generated images are spatially registered with respect to the real world. This requires accurate and rapid tracking of the location and gaze-direction of the user within the real world using a variety of locative sensors. As a result of such demanding tracking and spatial registration requirements, commercial augmented reality systems face major practical barriers.

The various exemplary embodiments provided herein are substantially different than these relevant art instantiations of augmented reality in that the computer generated visual content is presented to provide an enhanced music listening experience to a user as he or she traverses the real world and is thus temporally registered with the timing of the music and not necessarily spatially registered with the real world or even with simulated representation thereof.

Thus the present exemplary embodiments do not require accurate spatial registration of visual images with the real world in order to be effective for a user. Instead the present exemplary embodiments requires only time-synchronization of the visual content with playing audio content. By viewing overlaid visual content that is synchronized with the music, the user will have an enhanced music listening experience, even if the visual content is not spatially registered in a deliberate way with the real world. Thus the present exemplary embodiments are much simpler to implement than augmented reality systems of the prior art, not necessarily requiring sensors, head tracking hardware, and/or other tools and processes that accurately and rapidly monitors a user's position and/or gaze-direction with respect to the real world.

Thus the present exemplary embodiments may be implemented by a portable music playing apparatus that lacks head tracking and spatial registration capabilities. In fact, the present exemplary embodiments may be effective in low cost instantiations wherein the visual content is as subtle as a modulated translucently and/or color tinting of the transmissive display. Even with such subtle visual cues as brightness modulation and/or color tinting modulation, so long as they are time-synchronized with the playing music, the user will be given the feeling that he or she is present within a music-responsive version of the real world as he or she traverses at will. Where necessary, computer programs, routines and algorithms are envisioned to be programmed in a high level language, for example Java™ C++, C, C#, CORBA or Visual Basic™.

Figure 1:
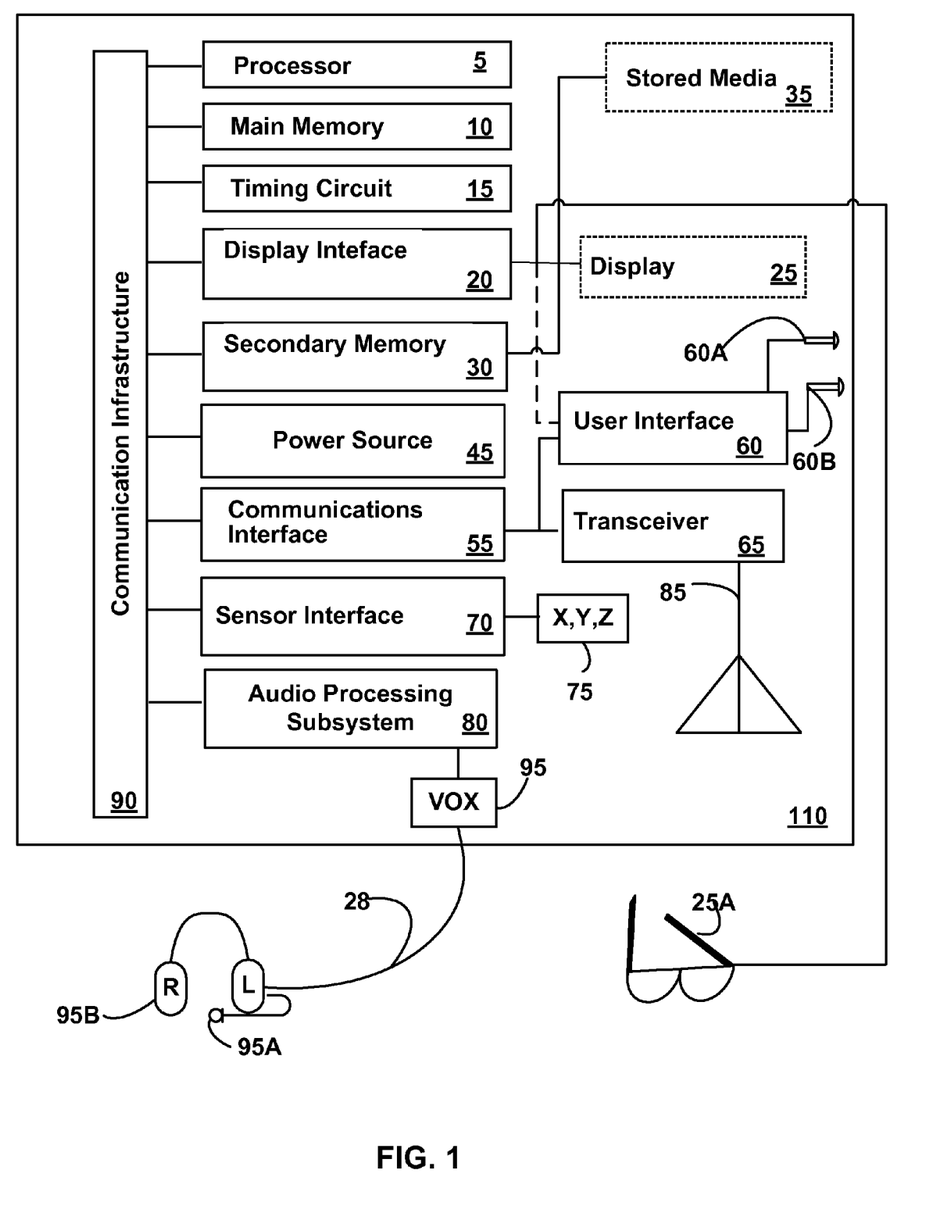
FIG. 1—depicts a generalized block diagram of a portable music player configured to provide a user with transmissive time-synchronized visual overlay content.

Referring first to FIG. 1, a general block diagram of portable music playing apparatus 110 is depicted such that it includes the apparatus, method and computer software of the present exemplary embodiments that enable the presentation of visual content upon a transmissive display that is apparent to a user to be time-synchronized with the playing musical content.

In this way the user is provided with a music listening experience within his or her direct physical surroundings that is enhanced with time-synchronized overlaid visual content. The portable music playing apparatus 110 may be worn or otherwise kept with the person of a user or may be integrated into another similar device such as a personal digital assistant, a cellular telephone, a wireless headset, a wearable display, or a wearable computer.

The portable music playing apparatus 110 includes a communications infrastructure 90 used to transfer data, memory addresses where data items are to be found and control signals among the various components and subsystems associated with the portable music playing apparatus 110. A processor 5 is provided to interpret and execute logical instructions stored in the main memory 10. The main memory 10 is the primary general purpose storage area for instructions, data, and media content to be processed by the microprocessor 5. The main memory 10 is used in its broadest sense and includes RAM, flash RAM, EEPROM and ROM. A timing circuit 15 is provided to coordinate activities within the portable music playing apparatus 110 in near real time, coordinate the time synchronization of music playing to the user and the presentation of overlaid visual content to the user upon a transmissive display 25, 25A. The processor 5, main memory 10 and timing circuit 15 are generally directly coupled to the communications infrastructure 90.

A display interface 20 is provided to drive a one or more displays 25, 25A. includes a head worn transmissive display 25A associated with the portable music playing apparatus 110. The display interface 20, when present, may be electrically coupled to the communications infrastructure 90 and provides signals to the display(s) 25, 25A. for visually outputting visual content that is perceived by the user as a visual overlay upon his or her direct view of the real world. The visual content may include electronically controlled tinting, color shifting, color density and overlaid graphical constructs such as shapes, lines, and abstract graphical designs.

Such visual content is presented upon the transmissive display 25A. such that a user can view the real world through the tinting, shading, color-shifting, color density and/or overlaid graphical constructs, and thereby experience the direct physical world with the visual content being perceived as overlaid visual enhancements.

Such visual content is presented in apparent time-synchronization with one or more varying audible features of the music content that is then currently being played to the user by the music playing apparatus. The one or more audible features may include one or more of the rhythm, tempo, melody, frequency, volume, structural portions, instrumental parts, drum beats, and/or tonal qualities of the music content and/or changes therein.

The display interface 20 may include a dedicated graphics processor and memory to support the displaying of graphics intensive media. The transmissive display 25A may be of a transmissive liquid crystal display (LCD) incorporated into glasses 25A worn by the user such that the user can view the real world through the LCD display 25A of the worn glasses and view the visual content presented by electronically activating the LCD. The visual content may include adjusting the translucency of the LCD, thereby providing the user with a view of the direct physical world that is electronically controlled to have variable brightness.

The entire visual field may be varied in brightness in unison in synchronization with the music or portions of the visual field may be varied separately in brightness in synchronization with the music. The visual content may include adjusting the color-tinting of the LCD, thereby providing the user with a view of the direct physical world that is electronically controlled to have variable color tinting, the changes in color tinting being coordinated in time with the playing musical audio content.

The entire visual field may be varied in color tinting in unison in synchronization with the music or portions of the visual field may be varied separately in color-tinting in synchronization with the music. The visual content may also include the presentation by the LCD of semi-transparent shapes, borders, boundaries, and abstract graphical designs, thereby providing the user with a view of the direct physical world that is electronically controlled to be visually responsive in time coordination with the music. The overlaid visual content may be presented to each of the user's eyes in concert or may be varied separately.

With respect to the details of the transmissive display 25A, a variety of arrangements may be employed and not limited to specifically LCD type displays. A variety of transmissive displays 25A are known in the relevant art that may be used for the present exemplary embodiments. In addition, it is expected that new transmissive display technologies will be developed in the future that could be used to support the present exemplary embodiments.

By way of examples and not limitations, a number of U.S. patent applications disclose transmissive display systems including U.S. patent application Nos. 20050248852 to Yamasaki published Nov. 10, 2005, 20040056870 to Shimoyama et al. published Mar. 25, 2004, 20020167536 to Valdes et al. published Nov. 14, 2002, and U.S. Pat. No. 6,474,809 to Tanijiri et al. issued Nov. 5, 2002, all of which are hereby incorporated by reference.

Referring back to FIG. 1, a secondary memory subsystem 30 is provided which houses retrievable storage units such as a hard disk drive, a removable storage drive, an optional logical media storage drive and an optional removal storage unit. One skilled in the art will appreciate that the hard drive may be replaced with flash memory. The removable storage drive may be a replaceable hard drive, optical media storage drive or a solid state flash RAM device. The logical media storage drive may include a flash RAM device, an EEPROM encoded with playable media, or optical storage media (CD, DVD). The removable storage unit may be logical, optical or of an electromechanical (hard disk) design. In general, the secondary memory 30 may include a large number of media files 35, including playable musical media files 35 that the user may retrievable select and listen to.

The present exemplary embodiments thereby allows a user to select a musical media file 35 from a plurality of stored musical media files 35, play that musical media file 35, and experience overlaid visual content that appears to be time synchronized with the selected musical media file. This configuration enables a highly flexible music listening apparatus in which a user may traverse the real world, select a musical media file 35 from a among a plurality of musical media file stored in the secondary memory 30 (or have them automatically selected by a software routine from memory based upon an algorithm and/or playlist), listen to the musical media file 35 through headphones 95B or other audio output hardware of the music playing apparatus, and simultaneously experience overlaid visual content (upon a transmissive display 25A) that is synchronized with the playing musical media file 35 and thereby enhances his or her listening experience by providing a visual view of his or her current physical surroundings that appears synchronized with and responsive to the music he or she is currently listening to.

A power source 45 is provided to supply electrical power to the various components, displays, systems and subsystems incorporated into the portable music playing apparatus 110. The power source 45 is an internal supply DC supply in the form of an internal battery. A communications interface 55 subsystem allows for the electrical coupling of a user interface 60 and a wireless transceiver 65 to the communications infrastructure 90 via the communications interface 55. The user interface 60 may be as simple as one or more pushbuttons, knobs, 60A, 60B or other similar devices.

In an exemplary embodiment, the selecting of musical media files may be accomplished manually by use of the one or more pushbuttons 60A, 60B. In some exemplary embodiments, the user may configure the type, quality, and/or characteristics of the visual content that is displayed upon the transmissive display in synchronization with the music by manipulating the user interface of the music player apparatus. For example, the user may select the type of visual content and/or select the particular musical features that the visual content is to be synchronized with to using a configuration menu of the user interface. For example, the user may select certain rhythm features, melody features, instrumental parts, frequency characteristics, structural portions, and/or other musical features to which one or more visual content types are to be synchronized.

The transceiver 65 and antenna 85 facilitates the remote exchange of data, for example musical media files and graphical images or constructs thereof, and synchronizing signals between the portable music playing apparatus 110 and one or more external computing devices 200. The external computing devices 200 may be a server, another portable music player, or may be a personal computer. In some exemplary embodiments the computing device 200 is a personal computer with which the user downloads music content, playlists, and/or other information to the music player apparatus. As stated previously, the transceiver 65 may be a wireless type to enable the music player apparatus to be highly portable and to allow the user to traverse the physical world at will.

A sensor interface 70 is optionally provided to allow the addition of sensors for example an accelerometer 75.

An audio processing subsystem 80 is provided and electrically coupled to the communications infrastructure 90. The audio processing subsystem 80 provides for the audio output of the musical content to the user. The musical content is generally accessed from the secondary memory 30 as a musical media file 35 in a standard media file format and is played to the user through headphones 95B or other audio output hardware.

A voice operated switch (VOX) 95 unit may optionally be attached to or incorporated into the audio processing subsystem 80 to enable the user to provide input and/or control the apparatus by voice. In some exemplary embodiments, a speech recognition system is employed to support user interface functions. Such embodiments generally include a microphone 95A. In some exemplary embodiments the headphones and/or microphone 95A,B are connected by a wireless transceiver using a wireless standard such a Bluetooth.

Thus in some exemplary embodiments a wireless headset (microphone 95A and earphone 95B) is provided and worn by the user. The headset 95A,B may be integrated with the transmissive display 25A. In some exemplary embodiments, the headset 95A,B includes all the music playing apparatus hardware and software. Thus, the entire apparatus including headphones, transmissive display, processor, memory, and other music playing components of apparatus 110, may be included within a single head worn unit. As such, the head worn unit may be configured in the shape and form of traditional eyeglasses.

The portable music playing apparatus 110 includes an operating system or equivalent operating environment, the necessary hardware and software drivers to fully utilize the devices coupled to its communications infrastructure 90, and a Music-Responsive Visual Overlay (MRVO) moderating program 140 operatively loaded into its main memory 10. This MRVO program 140 is operative to output visual overlays upon the transmissive display 25A in apparent time-synchronization with one or more audible features of the currently playing music. The MRVO program 140 may include routines for processing the playing music, identifying one or more audible characteristics and automatically generating visual overlays to be presented in apparent time-synchronization with the playing music being outputted to the user.

The audible characteristics that may be identified include, for example, rhythmic characteristics, melodic characteristics, frequency characteristics, and structural characteristics of the music content. The music media file 35 may be analyzed in different frequency bands. For example, rhythmic content may be extracted from a low frequency band as a means of identifying a bass line or bass drum. Similarly, music content maybe extracted from a high frequency band as a means of identifying snare drum hits and/or cymbal crashes. Thus by extracting rhythmic signal patterns within certain frequency bands, for example signal peaks within that frequency band that exceed a certain threshold, very specific types of rhythmic features may be extracted.

It is perceptually beneficial to extract rhythmic features such as one represented substantially by a bass line or snare hits because these are the types of features that human listeners are often perceptually aware.

Thus by extracting, for example, the rhythmic content produced by snare drum hits, the methods and apparatus of the present exemplary embodiments may be configured to present transmissive visual overlays to the user that are varied in apparent time-synchronization with the audible presentation of the snare drum hits to the user. The visual overlay may, for example, appear as abrupt change in transmissive color-tinting of all or part of the user's visual field in apparent time-synchronization with the snare drum hits. The visual overlay may be, for example, an abrupt change in transmissive brightness (i.e. translucency) of all or part of the user's visual field in apparent time-synchronization with the snare drum hits. The visual overlay may for example, appear as abrupt change in the color, form, size, orientation, and/or translucency of transmissively displayed shapes and/or abstract patterns up of all or part of the user's visual field in apparent time-synchronization with the percussion instruments (e.g., snare drum hits.) In some exemplary embodiments it may be any combination of the above.

In some exemplary embodiments, a plurality of different time-varying audio characteristics in the music content are identified and one or more different time-varying visual overlay features are time-synchronized to the each of the plurality of different time-varying audio characteristics.

For example, in one exemplary embodiment both a high frequency rhythm signal is identified in a piece of music content based upon signal peaks above a certain threshold within a high frequency band and a low frequency rhythm signal is identified upon signal peaks above a certain threshold within a low frequency band. In this exemplary embodiment, a first visual overlay characteristic may be varied in time synchronization with the identified high frequency signal and a second visual overlay characteristic may be varied in time synchronization with the identified low frequency signal. In this way a plurality of different visual overlay features may be changed with each of a plurality of different audio characteristics.

For example, a brightness visual overlay characteristic may be varied in apparent time-synchronization with a bass line rhythm identified in a low frequency band of the music content and a color tinting visual overlay characteristic may be varied in apparent time-synchronization with a snare drum rhythm identified in a high frequency band of the music content.

As examples, the color of a transmissively displayed shape is varied in apparent time-synchronization with a base line rhythm identified in a low frequency band of the music content and a the size of the transmissively displayed shape is varied in apparent time-synchronization with a snare drum rhythm identified in a high frequency band of the music content; the form of a transmissively displayed abstract pattern is varied in apparent time-synchronization with a bass line rhythm identified in a low frequency band of the music content and a the color of the transmissively displayed abstract pattern is varied in apparent time-synchronization with a snare drum rhythm identified in a high frequency band of the music content; and the height of a transmissively displayed shape, line, curve, or pattern is varied in apparent time-synchronization with a bass line rhythm identified in a low frequency band of the music content and a the width of the transmissively displayed shape, line, curve, or pattern is varied in apparent time-synchronization with a snare drum rhythm identified in a high frequency band of the music content. In another example, an additional visual overlay, such as an abrupt burst of increased translucence or altered color tinting may be imparted in response to and/or in time-synchronization with a detected cymbal crash in the musical media content. The abrupt burst may have a time duration that corresponds approximately with the ringing duration of the cymbal crash sound.

Software techniques for analyzing musical content and determining rhythmic characteristics, melodic characteristics, frequency characteristics, and structural features of the audio are well known to the current art. For example, the FASTLab Music Analysis Kernel (FMAK) is a collection of software classes developed at the University of California Santa Barbara for music/sound analysis. The FMAK processes the music and can derive over 100 attributes. The core analysis API uses a range of sound signal analysis techniques in the time and frequency domains, including RMS windowed envelope extraction, FFT analysis and spectral statistics, wavelet decomposition and rhythm tracking, LPC analysis and noise residual spectrum, and statistics combining these metrics. The FMAK core calculates this feature vector for many "windows" or time-slices of a song (e.g., 10 times a second), meaning that the size of the initial feature vector data set can be quite large. Such software, or equivalent software, may be used with the present exemplary embodiments to help support the musical characteristic identification requirements.

As described above, many of the exemplary embodiments include features that enable musical content to be processed and time-varying characteristics identified. This enables transmissive visual overlays to be generated automatically in apparent time-synchronization with time-varying characteristics of any piece of music content. In some exemplary embodiments of the MRVO program 140, visual content may be authored in advance and coordinated in time with musical content through a data file that is integrated into and/or linked with the musical media file.

In this way an author, (e.g., a music provider) can create specific visual content that is time-synchronized with specific audio content for presentation upon a transmissive display as visual overlays upon a user's view of the real world. Thus a data file may be used to choreograph transmissive visual content for a particular musical media file 35 and synchronize the transmissive visual content with the musical media file 35 in a predefined manner. In some exemplary embodiments, a combination of automatically generated transmissive visual content and previously authored data files that define transmissive visual content may be employed.

Figure 2:
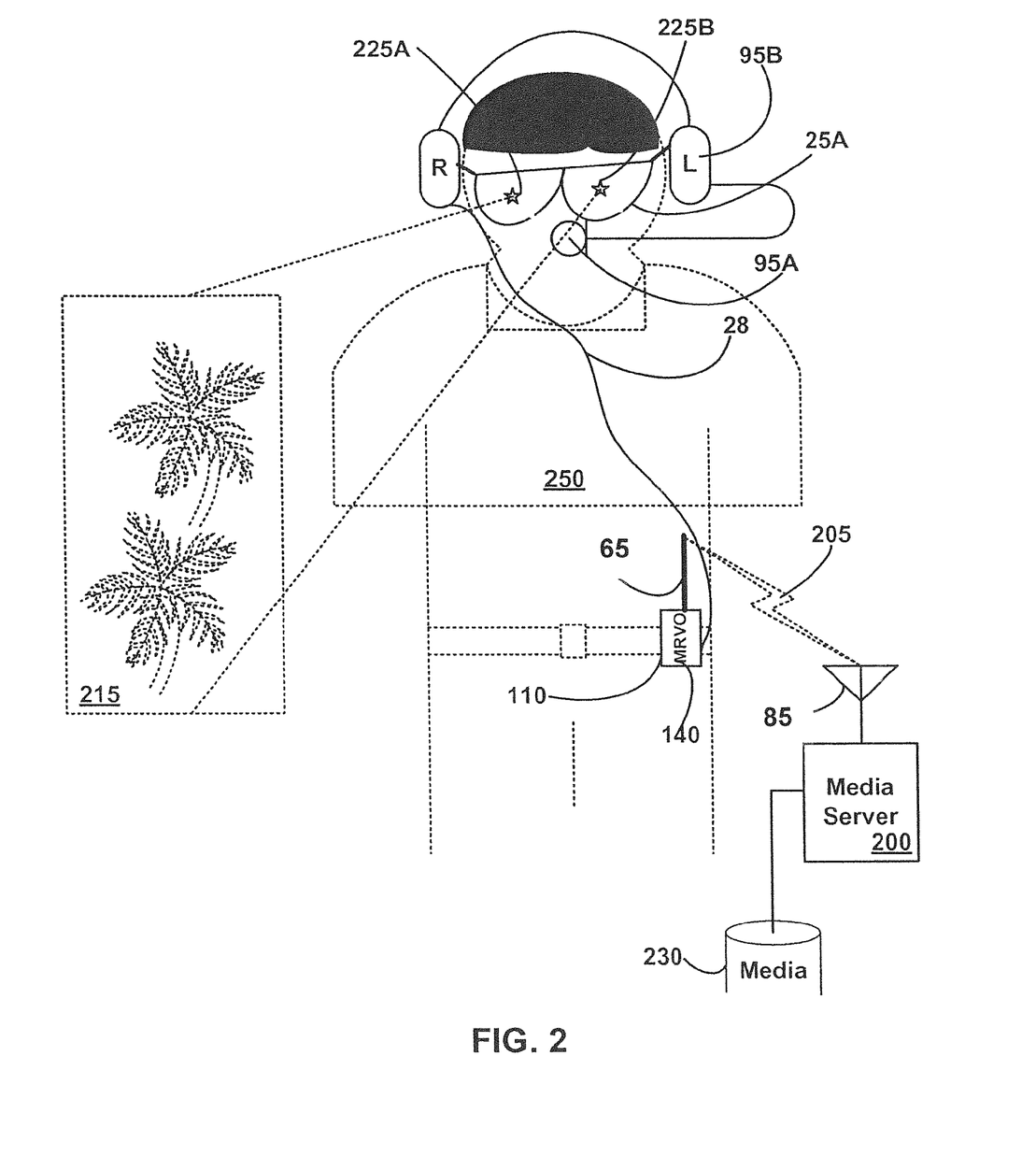
FIG. 2—depicts a user employing an exemplary embodiment of the portable music playing apparatus.

Referring to FIG. 2, an exemplary embodiment is shown where a user 250 is viewing a real world 215 while listening to music from an enabled portable music playing apparatus 110.

The portable music playing device 110 is shown clipped to the user's belt, although it may be worn or held in other ways. The portable music playing device 110 may be for example, an Apple iPod™ type portable media player 110 that has been configured to include the processor executable code of the present exemplary embodiments.

In this exemplary embodiment, the portable music playing apparatus 110 outputs audio content (i.e. playing music) to the user through headphones 95B and outputs transmissive visual overlays 225A,B through a wearable transmissive display 25A. The transmissive display 25A may be integrated into the form factor of eye-glasses, enabling the user 250 to view the real world 215 directly through the transmissive display 25A while also viewing the overlaid visual content 225A,B as described above.

This exemplary embodiment also provides the user with a microphone 95A for inputting voice commands to the user interface 60 of the portable music player 110. As shown the headphones 95B, the microphone 95A, and wearable display 25A are coupled by a cable 28 to the portable music playing apparatus 110. One skilled in the art will appreciate that a wireless link may exist between the microphone 95A, headphones 95B and wearable display 25A and the portable music playing apparatus 110. The wireless link may be, for example, a Bluetooth communication connection.

In some exemplary embodiments, the microphone 95A and earphones 95B may be integrated into the wearable display 25A. In this way, a user can don a headset 95A,B that appears like a pair of glasses and receive audio content, visual overlay content 225A,B, and communicate with a microphone. The headphones 95B may be replaced by a bone-conducting audio display apparatus. Similarly, the microphone 95A may be a bone-conducting voice capture device.

Using an antenna 85 coupled to the portable music playing apparatus 110, the portable music playing apparatus 110 is in processing communications over a wireless link 205 with a server 200. The server 200 may provide musical media files 35 and/or visual content 225A,B to be outputted to the transmissive display 25A by the music playing apparatus 110.

The server 200 accesses music media files and/or visual content from a datastore 230 and transmits the contents to the portable music playing apparatus 110 over the wireless link 205. In this way, the portable music playing apparatus 110 may receive additional media files for play by the user.

The server 200 may also store data files that describe and synchronize transmissive visual overlays and coordinates those overlays 225A,B with a particular musical media file. The portable music playing apparatus 110 may then download both the musical media file 35 and the transmissive visual overlay content from the server 200 over the communication link 205.

With respect to the time-varying audio characteristics in the music content that may be time-synchronized with varying transmissive visual overlays 225A,B; a wide variety of audio characteristics may be used. As described above, rhythmic characteristics, melodic characteristics, frequency characteristics, and/or structural characteristics of the music content may be time-synchronized with the varying of transmissive visual content 225A,B displayed on the transmissive display 25A.

In some exemplary embodiments, the overlaid visual content 225A,B is an electronically modulated translucency of the transmissive display 25A, the translucency being such that the user's view through the transmissive display 25A is varied in brightness in a manner that is time synchronized with one or more qualities of the music. In this way the user's view of the real world 215 is varied in brightness in a manner that is time synchronized with at least one time changing quality of the music.

In some exemplary embodiments, the overlaid visual content 225A,B is an electronically modulated color-tinting of the transmissive display 25A, the color-tinting being such that the user's view of the real world 215 is varied in color in a manner that is time synchronized with one or more qualities of the music. In some exemplary embodiments the visual content 225A,B is electronically modulated such that time varying shapes are produced upon the transmissive display, the time varying shapes varied in a manner that is time synchronized with one or more qualities of the music. In general, the shapes are semi-transparent such that the user can view the shapes 225A,B and the real world 215 through the shapes, thereby providing the illusion that they are overlaid upon the user's surroundings.

In this way the user will perceive shapes visually overlaid 225A,B upon his or her view of the real world 215, the shapes changing in size, orientation, translucency, color, and/or form in a manner that is time synchronized with one or more qualities of the music. In some exemplary embodiments the visual content 225A,B is electronically modulated such that a time varying boundary region is produced upon the transmissive display at the edges of the user's field of view, the time varying boundary region being varied in a manner that is time synchronized with one or more qualities of the music.

In some exemplary embodiments the visual content 225A,B is electronically modulated such that a time varying abstract graphical design is produced upon the transmissive display 25A, the time varying abstract graphical design being varied in size, shape, color, translucency, orientation, and/or physical form in a manner that is time synchronized with one or more qualities of the music.

In general the abstract graphical designs 225A,B are semi-transparent such that the user can view the real world through the designs, thereby providing the illusion that they are overlaid upon the user's surroundings. In this way the user may experience an abstract graphical design that appears to be overlaid 225A,B upon his or her direct view of the real world 215, the abstract design changing in size, shape, color, orientation, and/or form in a manner that is time synchronized with the music.

In various exemplary embodiments, the visual content 225A,B may be electronically modulated such that a time varying lines, curves, and/or edges are produced upon the transmissive display within the user's field of view, the time varying lines, curves, and/or edges being varied in size, shape, orientation, color, and/or form in a manner that is time synchronized with one or more qualities of the music; the visual content 225A,B is apparently time-synchronized to the rhythm of the music and/or to rhythmic changes in the music and/or to rhythmic features identified within a certain frequency band of the audio content; the visual content 225A,B may be apparently time synchronized to the melody of the music and/or melodic changes in the music; the visual content 225A,B may be apparently time-synchronized to the tempo of the music and/or tempo changes in the music; the visual content 225A,B may be apparently time-synchronized to the volume of the music and/or to volume changes in the music; the visual content 225A,B may be apparently time-synchronized to the frequency content of the music and/or to frequency changes in the music; the visual content 225A,B may be apparently time-synchronized to one or more frequency bands of the musical content; the visual content 225A,B may be apparently time synchronized to structural changes in the music, for example transitions in the music from one structural part to another structural part.

The structural parts may include but are not limited to a chorus, verse, bridge, intro, and solo of the musical composition; and the visual content 225A,B may be apparently time-synchronized to the musical part of one or more musical instruments within the music content. The musical instruments may include one or more of a base drum or snare drum. For example, the music playing apparatus 110 may be configured to provide a variation in transmissive visual overlay content 225A,B based upon which portion of a musical media file 35 currently playing, the different portions including two or more of a chorus portion, a verse portion, and bridge portion. In this exemplary embodiment, the music playing apparatus 110 is configured such that a different type or style of transmissive visual overlay 225A,B is provided during the chorus portion as is provided during the verse portion as is provided during the bridge portion of the musical media file.

In this way, the musical transitions between chorus, bridge, and verse are visually accentuated by the present exemplary embodiments. In addition, the present exemplary embodiments creates the visual illusion for the user that the real world 215 around him or her is changing in visual quality in response to the music changing from one to the other of a chorus portion, bridge portion, or verse portion. Thus for example, the present exemplary embodiments may be configured such that the all or part of the user's visual field is tinted a yellowish color during the musical playing of a chorus portion of a playing musical media file 35, is tinted a bluish color during the musical playing of the verse portion of the musical media file 35, and is tinted a greenish color during the musical playing of the bridge portion of the musical media file 35. In this way the user is given a visual experience such that his or her surroundings are visually changing in coordination with different portions of the musical piece. In addition, the above visual overlays 225A,B are enacted, the brightness (i.e. translucency) of some or all of the visual display 25A may be modulated in apparent time-synchronization with a rhythmic feature of the musical content.

For example, the translucency may be electronically modulated to abruptly pulse to a brighter level in synchronization with the timing of a detected snare-drum hit that exceeds a certain volume threshold. Thus as the snare drum is hit, the brightness of the transmissive display (i.e. the amount of light let in from the outside world) spikes quickly, giving the user a view of the real world that seems to pulse in time with the rhythm of the music.

By enabling the color tinting and translucency visual overlays 225A,B at the same time, each time-synchronized with a different musical feature of the music, a unique and interesting visual experience is provided for the user. In this example the user may view the real world 215 around him, having it pulse in brightness in time synchronization with the snare drum beat of the music. In addition, the color tinting of the real world 215 as seen by the user through the transmissive display changes from blue, to green, to yellow, as the music progresses from verse, to bridge, to chorus. Again, the real world 215 appears to change in visual appearance in coordination with the features of the music.

In some exemplary embodiments, the magnitude of a displayed transmissive visual overlay 225A,B may be modulated based upon the magnitude of a detected audio feature in the music. For example, in the example above the magnitude of the brightness pulse that is imparted upon the transmissive display in coordination with the detected snare drum hit may be modulated such that the level of brightness is dependent upon the magnitude of the audio spike signal that was caused by the snare drum hit. Thus the harder the snare drum is sounded (i.e. the larger the audio signal spike), the brighter the pulse of visual overlay presented to the user (i.e., the more translucent the overlay). In this way, the musical content is not only time-synchronized with the visual content but also magnitude-synchronized with the visual content.

A variety of such synchronizations may be employed; for example, a detected level in audio signal magnitude may be used to modulate the size, shape, color, orientation, and/or magnitude of a displayed visual overlay feature. Similarly a detected frequency level of an audio feature may be used to modulate the size, shape, color orientation, and/or magnitude of a displayed transmissive visual overlay feature. Similarly a detected duration in an audio feature may be used to modulate the size, shape, color orientation, and/or magnitude of a displayed transmissive visual overlay feature. Thus for example, the color tinting of some or all of the transmissive display may be modulated such that the color is varied in dependence upon a current frequency level, amplitude level, and/or feature duration present in the playing audio content.

In some exemplary embodiments, the placement of a displayed transmissive visual overlay 225A,B within a user's visual field may be modulated based upon a current audio feature in the music and/or a current change in an audio feature in the music. In some such embodiments the placement of one or more displayed transmissive visual overlay elements within the user's visual field is varied in dependence upon a current frequency level, amplitude level, rhythm, and/or feature present in the currently playing audio content.

In some exemplary embodiments, changes in the overlaid visual content 225A,B upon the transmissive display 25A are synchronized with the melody of the musical content. In some such embodiments the size, shape, color, orientation, and/or translucency of overlaid see-through visual elements on the transmissive visual display are varied in apparent time-synchronization with the melody of the music. In some such embodiments the placement of one or more visual overlay elements are within the user's visual field are time-synchronized with the melody of the musical content.

As used herein the term phrase "time-synchronization" means generally coordinated within the perceptual limits of a human listener. In other words, the music events and visual events need not be perfectly simultaneous to be time-synchronized, but only appears to be time-synchronized to a human user.

In some exemplary embodiments the transmissive visual content 225A,B that is varied in response to the playing musical content is varied also in response to detected footfalls of the user, for example as a result of the user walking, jogging, running, dancing, jumping, or exercising. In this way the, the music playing apparatus 110 may be configured to vary the at least a portion of the transmissive imagery based upon, and in apparent synchronization with, detected footfalls of the user.

For example, the degree of translucency of the transmissive display, the degree and/or shade of color-tinting of the transmissive display, the brightness of the transmissive display 25A, the shape and/or size of an opaque border region of the transmissive display 25A, and/or the shape and/or size of graphical elements displayed upon the transmissive display 25A may be modulated such that they vary in apparent time-synchronization with detected footfalls of the user.

In an exemplary embodiment, the transmissive display 25A is varied in pulses that correspond with apparent synchronicity with detected user footfalls (not shown). As examples, the transmissive display 25A may pulse brighter for a short period of time upon the detection of and in apparent synchronicity with each of a plurality of detected footfalls; the transmissive display 25A may pulse to a different color tinting for a short period of time upon the detection of and in apparent synchronicity with each of a plurality of detected footfalls; the transmissive display 25A may pulse to a different degree of translucency for a short period of time upon the detection of and in apparent synchronicity with each of a plurality of detected footfalls; and the transmissive display 25A may pulse to a different border shape or size, and/or with a different graphical overlay, for a short period of time upon the detection of and in apparent synchronicity with each of a plurality of detected footfalls.

Such variation of transmissive imagery will provide the user with a view of the real world that appears to vary with his or her footsteps, creating an immersive walking, running, dancing, or exercising experience in which the user's physical world seems visually responsive to his or her physical gait. It should be noted that such correlation is based on detected footfalls and not on an actual physical locative registration of the user with the physical world, thus enabling low cost implementation with inexpensive sensors for detecting footfalls.

The detection of footfalls may be achieved by sensored footwear that transmits data to the processor of the present exemplary embodiments by wireless link and/or by a sensored element that is affixed to the body and moves with footfalls, for example a waist worn sensor element. The sensors 75 within sensored footwear and/or within a waist worn element may be an accelerometer 75, the accelerometer 75 detecting the sudden accelerations imparted upon the user in response to each footfall. In some exemplary embodiments the degree to which the transmissive display 25A is varied is dependent at least in part upon the magnitude of the detected acceleration of each footfall event. Thus a strong footfall event may be made to correspond with a larger variation in translucency, color-tinting, and/or brightness, than a small footfall event.

Methods, apparatus, and computer program products for detecting footfall events of users and transmitting data reflective of such footfall events to a processor are disclosed in co-pending patent application Ser. Nos. 11/367,178 filed Mar. 2, 2006 and 11/427,320 filed Jun. 28, 2006, both by the present inventor and to a common assignee. The aforementioned patent applications are hereby incorporated by reference in their entirety as if fully set forth herein. In various exemplary embodiments, the MRVO program 140 may be configured to modulate the overlaid visual content in response to both detected footfalls of the user and detected changes in the audio characteristics of the music. In this way a user who is, for example exercising or dancing to music, may experience a visually modulated version of the real world that appears responsive to both the timing of the playing musical content and the timing of the user's footfalls.

Figure 3:
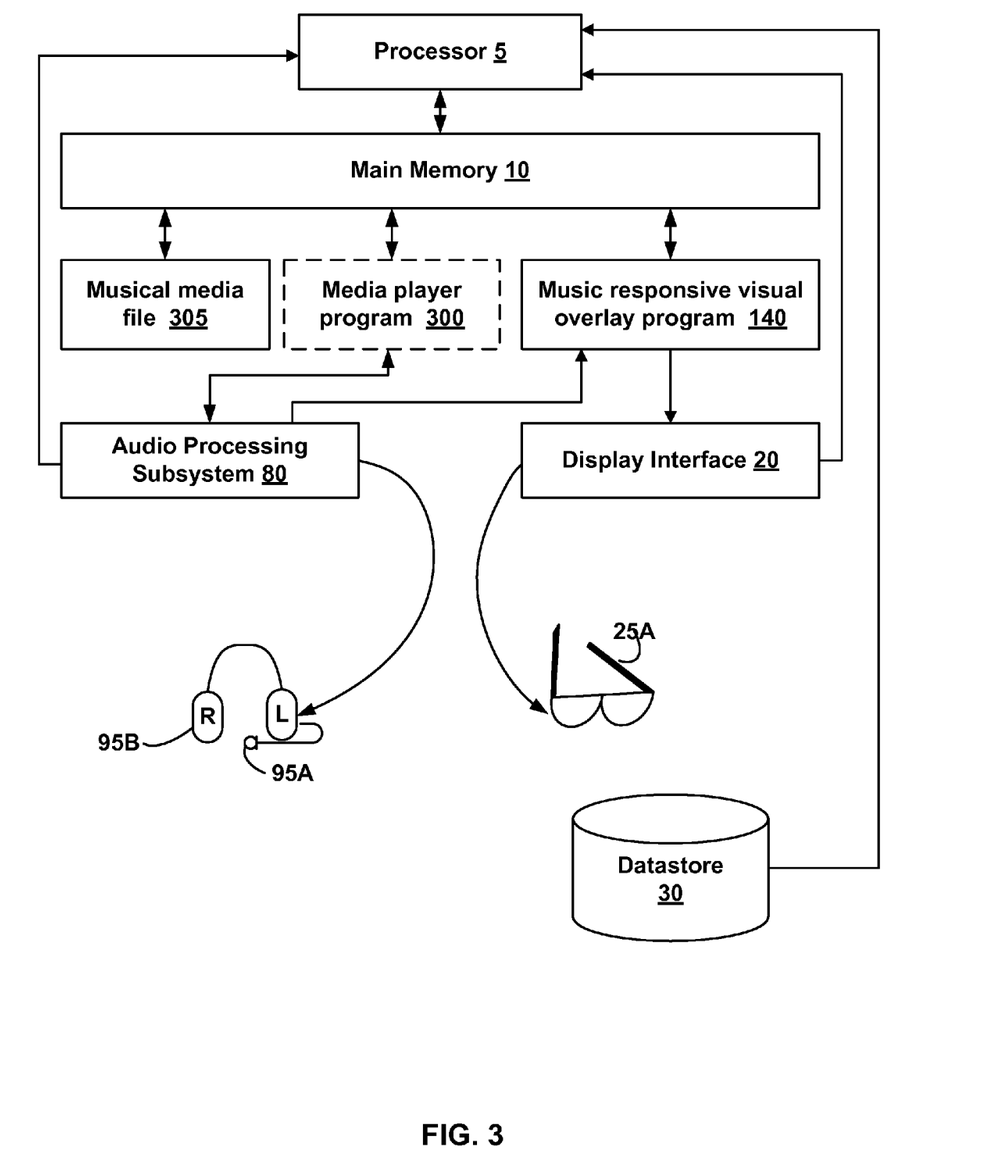
FIG. 3—depicts an exemplary block diagram of the functional relationships established between a music responsive visual overlay program with other components of the portable media player.

FIG. 3 provides an exemplary block diagram of the functional relationships established between a music responsive visual overlay program (MROV) 140 with other components of the portable media player 100. The MROV 140 may be provided as a single application or as a plurality of applications including but not limited to applets, methods, ActiveX controls, COM, DCOM, and executables which are commonly found in object oriented programming arrangements. The MROV 140 is operatively loaded into the main memory 10 of the portable media player and includes instructions executable by the processor 5 to modulate a visual output signal generated by the display interface 20 using an audio output signal generated by an audio processing subsystem 80. The audio output signal is derived from a musical media file 305 operatively loaded into the main memory 10 and played by an existing media player program 300 when executed by the processor generally in response to a user's interaction with the user interface 60. The audio processing subsystem 80 provides the audio output signal to the headset 95A,B while the display interface 20 provides the modulated visual signal to the transmissive display 25A. Additional media files may be retrieved and loaded into the main memory 10 from a local datastore 30 coupled to the processor 5 or retrieved from an external media server 200 as provided for in the discussion accompanying FIG. 2.

One skilled in the art will appreciate that the MROV 140 and the media player program 300 may be combined into a single application or arranged as part of the plurality of applications including but not limited to applets, methods, ActiveX control, COM, DCOM, and executables which are commonly found in object oriented programming arrangements as described above.

Figure 4:
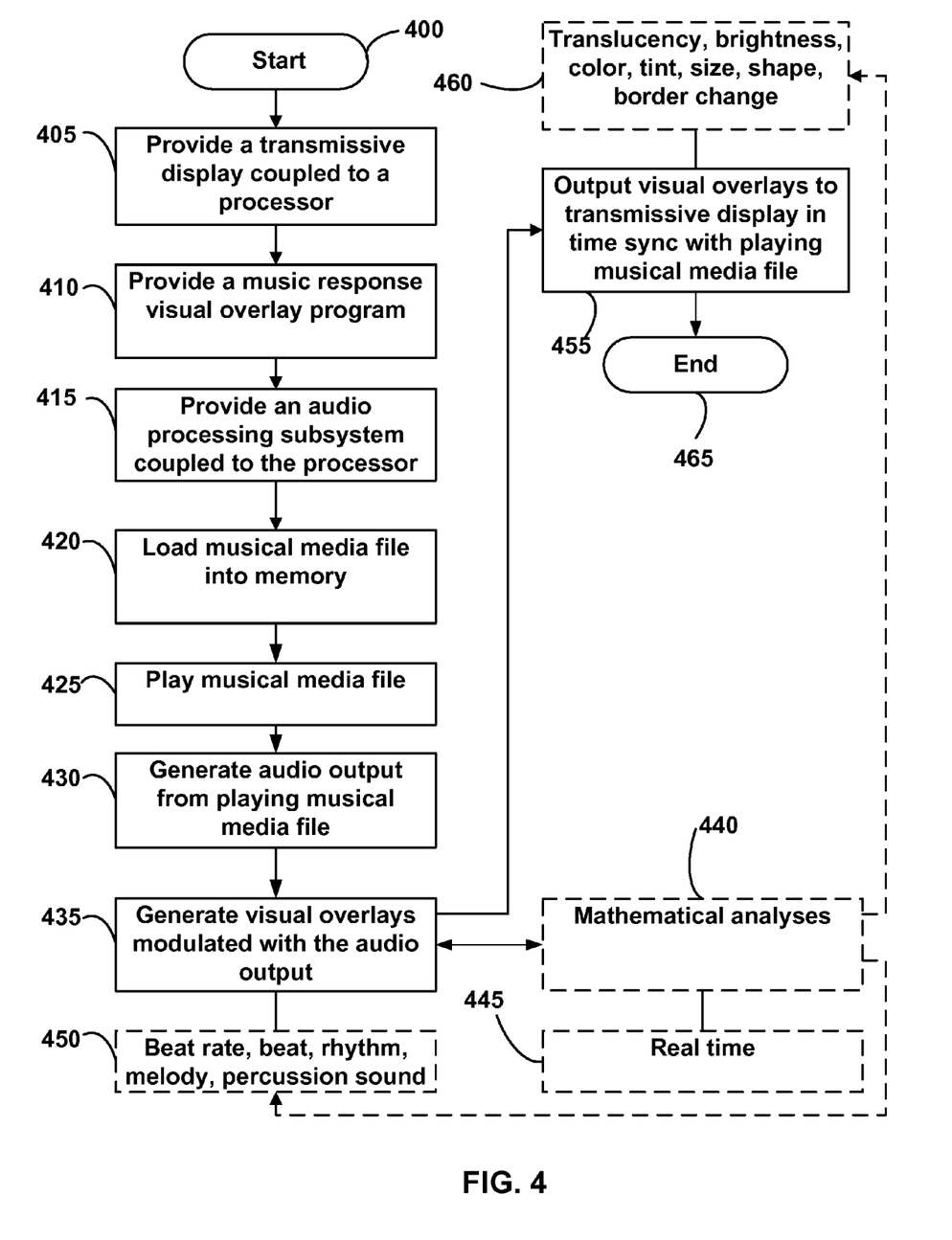
FIG. 4—depicts an exemplary process flow chart of the various exemplary embodiments.

Referring to FIG. 4, a generalized process flow chart for the various inventive embodiments is depicted. The process is initiated 400 by providing a transmissive display which is compatible with a processor associated with a portable media and coupling the transmissive display thereto 405. A music response overlay program is then provided and operatively loaded into a memory coupled to the processor 410. An audio processing subsystem which is likewise compatible with the processor is then provided and coupled to the processor 415. A musical media file is then provided by either retrieving the musical media file from a secondary or received from another source. The musical media file is then loaded into the memory 420 coupled to the processor and played 425. The audio processing subsystem generates an audio output signal of the playing musical media file 430 which the music response overlay program uses to modulate visual signals, as indicated by block 435.

In an exemplary embodiment, the generated visual overlays are determined by mathematical analyses of components which comprise the musical media file 440. For example, the mathematical analysis 440 may determine a beat rate 450 within the musical file. The music response overlay program may then produce a visual overlay that is modulated in time with the beat rate 450, or a whole number multiple of the beat rate 450. In one exemplary embodiment, the translucency 460 of the transmissive display may change in time with a determined beat rate 450 of the music, or whole number multiple of the beat rate 450 of the music, for example pulsing in translucency in time with the determined beat of the music.

In another exemplary embodiment, the color-tinting 460 of the transmissive display may change in time with a determined beat rate 450 of the music, or whole number multiple of the beat rate 450 of the music, for example pulsing with varying color-tints 460 that change in time with the beat 450 of the music.

In yet another exemplary embodiment, the shape 460 of an overlaid border 460 region presented on the transmissive display may change in time with a determined beat rate 450 of the music, or whole number multiple of the music, for example pulsing with a varying shape 460 that change in time with the beat 450 of the music. In still another exemplary embodiment, the translucency 460 of the visual display may be modulated to vary in time with a first multiple of the beat rate 450 and the color tinting 460 of the transmissive display may be modulated in time with a second multiple of the beat rate 450.

In this way the user experiences a view of the real physical world that varies both in brightness 460 and color-tinting 460, each synchronized independently with the beat 450 of the music. The mathematical analyses may be performed in real time as the musical media file is played 445. In another exemplary embodiment, the generated visual overlays are determined from one or more of the rhythm, melody, or specific percussion instrument sound components which comprise the musical media file 450.

The modulated visual overlays are then outputted to the transmissive display such that the user may visually perceive the visual overlays upon his or her direct view of the real world viewed through the transmissive displays 455. The modulated visual overlays may appear as variations in translucency, brightness, color, tint, shape, size or any combination thereof 460. When the musical media file completes its play, the process ends 465.

These exemplary embodiments have been described in detail with reference to various embodiments. It should be appreciated that the specific embodiments described are merely illustrative of the principles underlying the inventive concept. It is therefore contemplated that various modifications of the disclosed embodiments will, without departing from the spirit and scope of the exemplary embodiments, be apparent to persons of ordinary skill in the art.

What is claimed:

1. A portable apparatus for providing music-responsive transmissive visual overlays that augment a user's view of the real world, the apparatus comprising:
    a processor;
    a memory coupled to the processor;
    a transmissive display functionally coupled to the processor and configured to display visual content such that a user perceives the displayed visual content as a real-time visual overlay upon the user's view of the real world;
    a musical media file operatively loaded into the memory;
    a music responsive visual overlay program operatively loaded into the memory including instructions executable by the processor to modulate the visual content displayed upon the transmissive visual display in apparent time synchronicity with an audio output of the musical media file; and,
    an audio processing subsystem functionally coupled to the processor configured to provide the audio output from play of the musical media file to the user.

2. The apparatus according to claim 1 wherein the visual content includes an image with varying translucency time-synchronized with the playing of the musical media file thereby providing the user a view of the real world that visually varies in brightness in apparent time synchronicity with the audio output.

3. The apparatus according to claim 1 wherein the visual content includes an image with varying color-tinting time-synchronized with the playing of the musical media file thereby providing the user a view of the real world that visually varies in color-tinting in apparent time synchronicity with the audio output.

4. The apparatus according to claim 1 wherein the visual content includes an opaque border area that varies in at least one of size or shape with the playing of the musical media file, thereby providing the user a view of the real world that visually varies in apparent time synchronicity with the audio output.

5. The apparatus according to claim 1 wherein the modulated visual content is time-synchronized with a rhythm associated with the playing musical media file.

6. The apparatus according to claim 1 wherein the modulated visual content is time-synchronized with a melody associated with the playing musical media file.

7. The apparatus according to claim 1 wherein the modulated visual content is time-synchronized with a percussion sound associated with the playing musical media file.

8. The apparatus according to claim 1 wherein the visual content is modulated in a time-synchronized manner with respect to the audio outputting, the modulation being performed as a result of a mathematical analysis of the musical media file.

9. The apparatus according to claim 8 wherein the result is generated in real time.

10. A method for providing music-responsive transmissive visual overlays that augment a user's view of the real world, the method comprising:
    providing a transmissive display for displaying visual content such that a user perceives the displayed visual content as a real-time visual overlay upon the user's view of the real world;
    functionally coupling the transmissive display to a processor associated with a portable media player;
    providing a music responsive visual overlay program including instructions executable by the processor for modulating the visual content displayed upon the transmissive visual display in apparent time synchronicity with an audio outputting of a playing musical media file; and,
    functionally coupling an audio processing subsystem to the processor for audio outputting the playing musical media file to the user.

11. The method according to claim 10 wherein the visual content includes an image with varying translucency time-synchronized with the playing musical media file thereby providing the user a view of the real world that visually varies in brightness in apparent time synchronicity with the audio outputting.

12. The method according to claim 11 wherein at least a portion of the visual overlay is modulated to a particular translucency level in at least partial dependence upon a detected change in an amplitude within the playing musical media file.

13. The method according to in claim 10 wherein the wherein the visual content includes an image with varying color-tinting time-synchronized with the playing musical media file thereby providing the user a view of the real world that visually varies in color-tinting in apparent time synchronicity with the audio outputting.

14. The method according to claim 13 wherein at least a portion of the visual overlay is modulated to a particular color tinting in at least partial dependence upon a detected change in amplitude within the playing musical media file.

15. The method according to in claim 10 wherein the visual content includes an opaque border area that varies in at least one of size and shape in time with the playing musical media file, thereby providing the user a view of the real world that visually varies in apparent time synchronicity with the playing musical media file.

16. The method according to claim 10 wherein the modulated visual content is time-synchronized with a rhythm associated with the playing musical media file.

17. The method according to claim 10 wherein the modulated visual content is time-synchronized with a melody associated with the playing musical media file.

18. The method according to claim 10 wherein the modulated visual content is time-synchronized with a percussion sound associated with the playing musical media file.

19. The method according to claim 10 wherein the visual content is modulated in a time-synchronized manner with respect to the audio outputting, the modulation being performed as a result of a mathematical analysis of the musical media file.

20. The method according to claim 19 wherein the result is generated in real time.

21. A computer program product embodied in a tangible form comprising instructions executable by a processor to:
   play a musical media file stored in a memory coupled to the processor;
   generate an audio output from the play of the musical media file;
   generate a visual content modulated in apparent synchronicity with at least one varying characteristic of the generated audio output for display upon a transmissive visual display coupled to the processor;
   output the modulated visual content to the transmissive visual display such that a user perceives the displayed visual content as a real-time visual overlay upon the user's view of the real world which varies in apparent time synchronicity with the audio output generated by play of the musical media file.

22. The computer program product according to claim 21 wherein the modulated visual content includes an image which varies in one or more of size, shape, color, tint, brightness, translucency and any combination thereof in the apparent time synchronicity with the audio output of the musical media file.

* * * * *

UNITED STATES PATENT AND TRADEMARK OFFICE
CERTIFICATE OF CORRECTION

PATENT NO. : 7,732,694 B2 Page 1 of 1
APPLICATION NO. : 11/626992
DATED : June 8, 2010
INVENTOR(S) : Louis B. Rosenberg It is certified that error appears in the above-identified patent and that said Letters Patent is hereby corrected as shown below:

In the CLAIMS:
Claim 13, column 17, line 10 delete "wherein the".

Signed and Sealed this

Sixteenth Day of November, 2010

David J. Kappos
*Director of the United States Patent and Trademark Office*